US007213337B1

(12) United States Patent
Pôrto et al.

(10) Patent No.: US 7,213,337 B1
(45) Date of Patent: May 8, 2007

(54) METHOD OF MANUFACTURING PISTONS AND COMPONENTS THEREOF, AND FORGING TOOLS

(75) Inventors: Antônio José de Araújo Pôrto, Campinas (BR); João Lester Garcia Lopes, Jundiai (BR); Airton Aparecido Chignolli, Jundiai (BR)

(73) Assignee: ThyssenKrupp Automotive AG, Bochem (DE)

( * ) Notice: Subject to any disclaimer, the term of this patent is extended or adjusted under 35 U.S.C. 154(b) by 0 days.

(21) Appl. No.: 09/837,951

(22) Filed: Apr. 19, 2001

(30) Foreign Application Priority Data

Mar. 21, 2001 (DE) ................................ 101 13 629

(51) Int. Cl.
*B23P 15/10* (2006.01)

(52) U.S. Cl. ................. 29/888.04; 29/557; 29/DIG. 18

(58) Field of Classification Search ............. 29/888.04, 29/888.049, 897.2, 527.1, 557, 558, DIG. 18; 92/208, 172; 123/193.6; 72/377
See application file for complete search history.

(56) References Cited

U.S. PATENT DOCUMENTS 2,539,903 A * 1/1951 Gruetjen
3,152,523 A * 10/1964 Whitfield et al.
3,915,141 A * 10/1975 Ottl et al.
4,083,292 A * 4/1978 Goloff
4,532,686 A * 8/1985 Berchem
4,662,047 A * 5/1987 Berchem
4,843,698 A * 7/1989 Ripberger et al.
4,887,449 A * 12/1989 Kanai et al.
5,081,967 A * 1/1992 Kemnitz et al.
5,150,517 A * 9/1992 Martins Leites et al.
6,070,323 A * 6/2000 Koike et al.
6,112,642 A * 9/2000 Jarrett et al.
6,266,878 B1 * 7/2001 Durkin et al. ......... 29/888.044
6,363,608 B1 * 4/2002 Koike et al.

* cited by examiner

*Primary Examiner*—T. Nguyen
(74) *Attorney, Agent, or Firm*—Max Fogiel

(57) ABSTRACT

A method of manufacturing an entire piston, piston heads for example, especially intended for internal-combustion engines, wherein in an initial manufacturing step a blank that will eventually constitute the piston is preliminarily forged along a prescribed axis, shaping appropriate contours, and wherein in at least one subsequent manufacturing step the preliminarily shaped piston is finally forged along at least one other axis, creating additional contours.

9 Claims, 3 Drawing Sheets

METHOD OF MANUFACTURING PISTONS AND COMPONENTS THEREOF, AND FORGING TOOLS

BACKGROUND OF THE INVENTION

The present invention concerns a method of manufacturing pistons and components thereof, piston heads for example, especially intended for internal-combustion engines.

German A 3 801 847 discloses a method of manufacturing pistons for internal-combustion engines, each piston being provided with at least one metal reinforcement. The reinforcement, of a material with open pores, is heated and introduced into a heated die. A prescribed amount of aluminum or aluminum alloy is injected into the die. A plunger is introduced into the die, compressing the cooling melt. The compressed melt flows around the reinforcement and fills both the piston mold and the reinforcement's pores. Once the melt has hardened, the piston is removed from the die along with the reinforcement and machine finished.

A piston especially intended for internal-combustion engines is known from German A 19 935 410. This piston features a shaft with a bore for a bolt and an adjacent annular field. Webs extend from the bore toward the annular field and/or toward the end of the shaft remote from the field. Pistons of this type are preferably cast.

German A 3 222 582 describes a method of manufacturing a base for a multiple-component piston, especially intended for large diesel engines. The center of the base is domed and surrounded by a shoulder and has an interior hub. The shoulder accommodates piston rings and rests against a separate piston shaft, onto which the hub can be screwed and/or welded. In this method a bowl with an area that matches the shape of the piston's center and has a surrounding collar is in an initial shaping step forged from a heat-resistant steel. The shoulder and the hub are then in a subsequent shaping step forged out of the collar. This approach, which involves forging axially in terms of the piston's base, however, allows only contours with prescribed wall thicknesses, especially radial wall thicknesses, and the product is heavy and requires a lot of material.

German A 3 222 582 describes a method of manufacturing a base for a multiple-component piston, especially intended for large diesel engines. The center of the base is domed and surrounded by a shoulder and has an interior hub. The shoulder accommodates piston rings and rests against a separate piston shaft, onto which the hub can be screwed and/or welded. In this method a bowl with an area that matches the shape of the piston's center and has a surrounding collar is in an initial shaping step forged from a heat-resistant steel. The shoulder and the hub are then in a subsequent shaping step forged out of the collar. This approach, which involves forging axially in terms of the piston's base, however, allows only contours with prescribed wall thicknesses, especially radial wall thicknesses, and the product is heavy and requires a lot of material.

SUMMARY OF THE INVENTION

The object of the present invention is a method of manufacturing pistons and components thereof, piston heads for example, whereby the easily worn-down aluminum skirts are eliminated, less material is required, and the pistons or components will be simple to manufacture with ideal wall thicknesses. Another object of the present invention is a forging tool that can be employed to easily manufacture such pistons or components of even complex designs.

This object is attained in accordance with the present invention in a method of manufacturing pistons and components thereof, piston heads for example, especially intended for internal-combustion engines, wherein in an initial manufacturing stage a blank that will eventually constitute the piston or piston component is preliminarily forged along a prescribed axis, shaping appropriate contours, and wherein in at least one subsequent manufacturing step the preliminarily shaped piston is finally forged along at least one other axis, creating additional contours.

The same object is also attained in accordance with the present invention in a forging tool comprising various tool parts in the vicinity of the upper and lower die halves, whereby these tool parts can be advanced within planes defined by axes toward a blank for the purpose of preliminarily and finally shaping pistons and components thereof and whereby tool parts of at least one die half are employed for preliminary forging and tool parts of at least one die half are employed for final forging.

In a departure from the method of manufacture described in German A 3 801 847, accordingly, a steel blank, optionally a rod, that has been produced by multiple-dimensional (multiple-axis) forging in one and the same forging tool can be employed in accordance with the present invention. Aluminum skirts like those employed in the prior art are thereby unnecessary. In its simplist configuration, the piston is produced through two-axes forging of a steel blank, whereby the forging axes are mutually perpendicular. When the shape is more complex, however, the blank could conceivably also be forged over at least one other plane at an angle to the aforesaid two axes.

This approach to the manufacture of a multiple-axis piston or component thereof by forging solves, as hereintofore mentioned, the problem of premature wear on the part of the aluminum skirt typical of conventional configurations in that the piston's or component's positioning skirt is steel and integrated into the overall product. German A 322 582 in no way intimates such a procedure. Furthermore, multiple-axis forging of a blank, optionally a rod, can also produce filigreed contours, which has been possible heretofore only by casting, while consuming very little material.

BRIEF DESCRIPTION OF THE DRAWINGS

The present invention will now be specified with reference to the accompanying drawing, wherein.

DETAILED DESCRIPTION OF THE INVENTION

Figure 1:
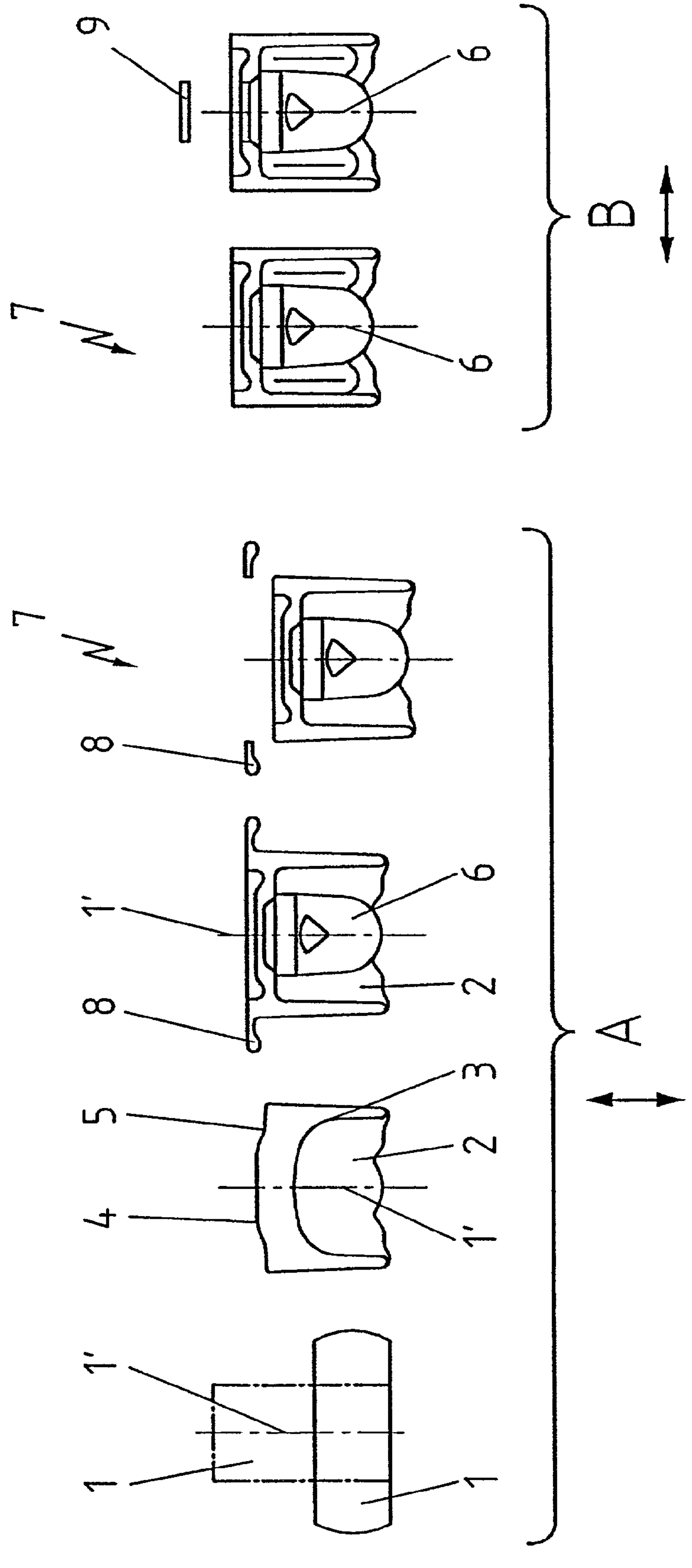
FIG. 1 is a sketch illustrating the principle involved in manufacturing piston heads.

FIG. 1 shows the steps involved in manufacturing a piston head. A bar-shaped steel blank 1 is heated by induction for example and upset in a die in axis 1'. The die can be preliminarily heated if necessary. A cavity 2 is shaped out of the blank in the same die and in the same direction, and a radial zone 3 similarly produced. First structures 5 are simultaneously shaped onto the upper face 4 of the blank.

Sides 6 are then shaped in, and the inner surface of cavity 2 optimized. Sides 6 correspond to the outer diameter of cavity 2. The preliminarily shaped piston 7 is then freed of excess material 8. Since all the operations of reshaping and shaping on heretofore specified occur in the same axis (indicated by the arrow), the shaping of blank 1 into a preliminarily shaped piston 7 represents an initial manufacturing step A.

The preliminarily shaped piston 7 is now reshaped in the very same forging tool. In this step the facing sides 6 are radially upset, positioning them within the circumference of piston 7. Any excess material 9 is removed, a procedure that is, however, not always necessary but depends on the state of the piston.

Figure 2:
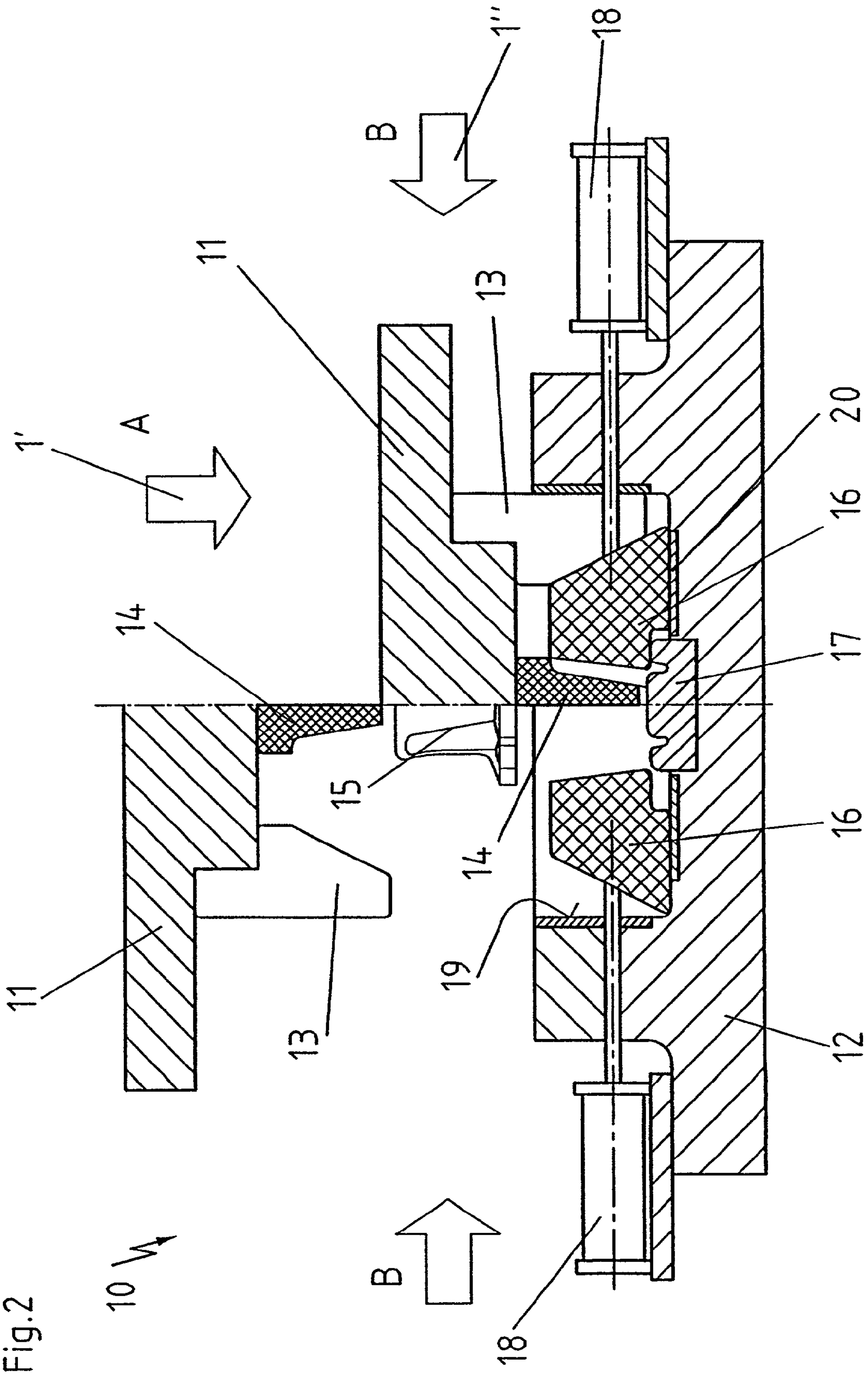
FIG. 2 is a sketch illustrating a forging tool in accordance with the present invention in principle.

FIG. 2 is a schematic illustration of a forging tool 10 with an upper die half 11 and a lower die half 12. Forging tool 10 is represented open on the left and closed on the right of the figure. Upper die half 11 accommodates tool parts 13, 14, and 15 and lower die half 12 tool parts 16 and 17. The tool parts 16 accommodated in lower die half 12 can be displaced in the direction indicated by the arrows by hydraulic piston-and-cylinder mechanisms 18. Tool parts 13 and 16 slide over surfaces 19 and 20 in lower die half 12. In initial manufacturing step A, upper die half 11 is displaced along with its tool parts 13, 14, and 15 along the axis 1' of lower die half 12. Tool parts 16 are in a position ready to carry out along the perpendicular the reshaping operations comprising the initial manufacturing step A represented in FIG. 1. Next, piston-and-cylinder mechanism 18 displaces tool parts 16 along axis 1", preparing them to carry out the shaping operations comprising subsequent manufacturing step B.

Figure 3:
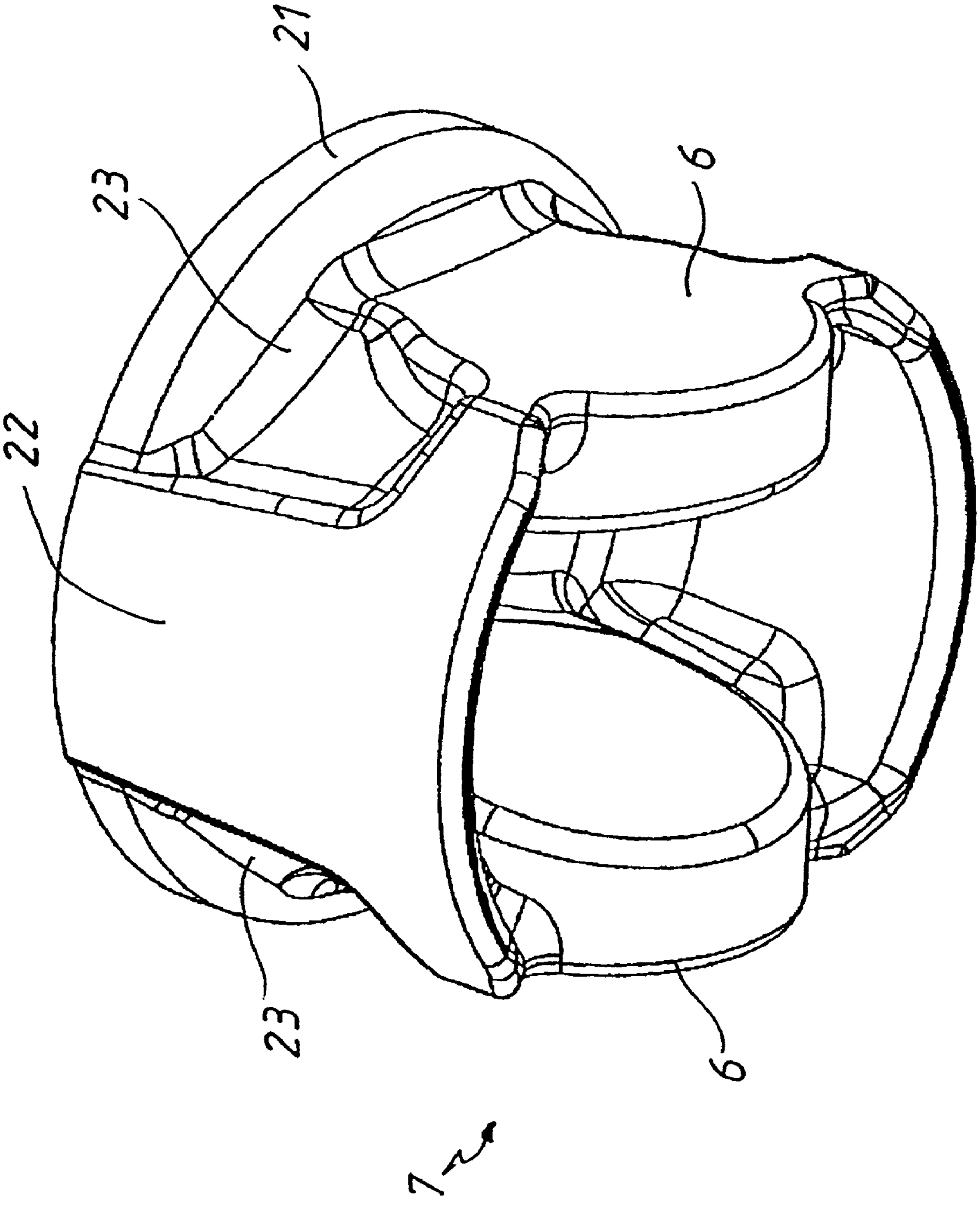
FIG. 3 illustrates a piston head forged in accordance with the method illustrated in FIG. 1 in the forging tool illustrated in FIG. 2.

FIG. 3 is a perspective view of a piston 7 manufactured out of blank 1 over the course of manufacturing steps A and B, with sides 6 inside circumference 21. Sides 6 will eventually be bored through to accommodate an unillustrated bolt without the use of a sleeve. This bolt will be shorter than those employed in the prior art. Skirt 22 matches the circumference 21 of piston 7, its wall is optimally thick, and it extends into the radially recessed sides 6 by way of webs 23.

In the initial manufacturing step (A) a rod-like and optionally cylindrical blank (1) is upset and provided with a skirt 22 and a cavity 2, whereby contours 3–6 are shaped onto the shirt 22 along a longitudinal axis 1' in the vicinities of its inner and outer circumferences 3 and of its upper and lower faces 4.

In the subsequent manufacturing step (B) further contours 6 are shaped onto the preliminarily-shaped piston 7 along another axis 1" by forging at approximately 90° to the first axis 1', especially the longitudinal axis.

The invention claimed is:

1. A method of manufacturing an entire piston for internal-combustion engines comprising the steps of: (A) manufacturing initially a blank to constitute a piston by preliminarily forging along a first prescribed axis, and shaping specific contours on the forged blank to form a preliminarily-shaped piston; (B) at least one subsequent manufacturing step of forging the preliminarily-shaped piston along at least one other second axis for creating additional contours, said piston being formed by two separate forging steps, each of said steps having a different contour along a different axis; and boring through sides of said piston independent of the manufacturing steps (A) and (B) for receiving a sleeveless bolt; wherein said preliminarily shaped piston having a reducible wall thickness and reinforcements during the subsequent manufacturing step (B); and further including the step of shaping an integrated skirt in one of the two manufacturing steps (A) and (B) onto the preliminarily shaped piston, said skirt being shaped during the subsequent manufacturing step (B).

2. A method as defined in claim 1, wherein said manufacturing step (A) comprises preliminarily shaping said blank along a longitudinal axis of said blank.

3. A method as defined in claim 1, wherein said blank is a rod-like blank; upsetting the blank to form a skirt, a cavity and a plurality of contours, said contours being shaped onto said skirt along a longitudinal axis of said skirt in vicinities of inner and outer circumferences and of upper and lower faces of said skirt.

4. A method as defined in claim 3, wherein said additional contours are shaped onto the preliminarily-shaped piston along said other second axis by forging to said first prescribed axis, said first prescribed axis being a longitudinal axis.

5. A method as defined in claim 1, wherein the initial manufacturing step (A) along the first prescribed axis and the subsequent manufacturing step (B) along the other second axis are carried out in the same forging tool into which said blank can be heated before insertion.

6. A method as defined in claim 1, wherein said blank is of steel.

7. A method as defined in claim 1, including an additional manufacturing step for reforming said piston.

8. A method as defined in claim 1, including the steps of removing excess material and producing recesses by punching during at least one of the manufacturing steps (A & B) in manufacturing said piston.

9. A method of manufacturing an entire piston for internal-combustion engines comprising the steps of: (A) manufacturing initially a blank to constitute a piston by preliminarily forging along a first prescribed axis, and shaping specific contours on the forged blank to form a preliminarily-shaped piston; (B) at least one subsequent manufacturing step of forging the preliminarily-shaped piston along at least one other second axis for creating additional contours, a said piston being formed by two separate forging steps, each of said steps having a different contour along a different axis; and boring through sides of said piston independent of the manufacturing steps (A) and (B) for receiving a sleeveless bolt said manufacturing step (A) comprises preliminarily shaping said blank along a longitudinal axis of said blank, said blank being a rod-like blank; upsetting said blank to form a skirt, a cavity and a plurality of contours, said contours being shaped onto said skirt along a longitudinal axis of said skirt in vicinities of inner and outer circumferences and of upper and lower faces of said skirt, said additional contours being shaped onto the preliminarily-shaped piston along said other second axis by forging to said first prescribed axis, said first prescribed axis being a longitudinal axis, said initial manufacturing step (A) along the first prescribed axis and the subsequent manufacturing step (B) along the other second axis being carried out in the same forging tool into which said blank can be heated before insertion, said preliminarily shaped piston having a reducible wall thickness and reinforcements during the subsequent manufacturing step (B); shaping an integrated skirt in one of the two manufacturing steps onto the preliminarily shaped piston, said skirt being shaped during the subsequent manufacturing step (B), said blank being of steel; an additional manufacturing step of reforming said piston; removing excess material and producing recesses by punching during at least one of the manufacturing steps (A) and (B) in manufacturing said piston.

* * * * *